US012066334B2

(12) United States Patent
Choi

(10) Patent No.: US 12,066,334 B2
(45) Date of Patent: Aug. 20, 2024

(54) SENSOR CONFIGURED TO SENSE HEAT OR INFRARED LIGHT AND ELECTRONIC DEVICE INCLUDING SAME

(71) Applicant: Samsung Electronics Co., Ltd., Suwon-si (KR)

(72) Inventor: Yeong Suk Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 155 days.

(21) Appl. No.: 17/851,724

(22) Filed: Jun. 28, 2022

(65) Prior Publication Data
US 2023/0026770 A1    Jan. 26, 2023

(30) Foreign Application Priority Data

Jun. 29, 2021  (KR) .......................... 10-2021-0085174

(51) Int. Cl.
*G01J 5/20*          (2006.01)
*G01J 5/02*          (2022.01)

(52) U.S. Cl.
CPC ............... *G01J 5/20* (2013.01); *G01J 5/0215* (2013.01)

(58) Field of Classification Search
CPC ...... G01J 5/20; G01J 5/0215; G01J 2005/065; G01J 5/0225; G01J 5/023; G01J 5/0235; G01J 5/06; G01J 5/0813; G01J 5/02; G01J 5/0853; G01J 2005/204; C08F 297/026; C08K 3/10; C08K 3/22; C08K 3/28; C08L 53/00; H10K 39/30
See application file for complete search history.

(56) References Cited

U.S. PATENT DOCUMENTS

| 5,818,322 | A | * | 10/1998 | Tasumi ................. | H01L 31/105 |
| | | | | | 257/E31.035 |
| 8,941,064 | B2 | | 1/2015 | Akin et al. | |
| 9,417,134 | B2 | | 8/2016 | Koechlin et al. | |
| 9,933,312 | B2 | | 4/2018 | Yee et al. | |
| 9,989,405 | B2 | * | 6/2018 | Van Buggenhout .. | G01J 1/4228 |
| 10,615,202 | B2 | | 4/2020 | Wu | |
| 10,707,250 | B2 | | 7/2020 | Wu | |

(Continued)

FOREIGN PATENT DOCUMENTS

| JP | H07-297454 A | 11/1995 |
| JP | 2008-039570 A | 2/2008 |

(Continued)

*Primary Examiner* — David P Porta
*Assistant Examiner* — Gisselle M Gutierrez
(74) *Attorney, Agent, or Firm* — Harness, Dickey & Pierce, P.L.C.

(57) ABSTRACT

A sensor configured to sense heat or infrared light including a substrate includes a plurality of recess portions; a cavity inside the substrate along a bottom surface and opposing side surfaces of the substrate; a lower reflective layer disposed on at least one of an upper surface of the bottom surface of the substrate, a lower surface of the bottom surface of the substrate, and a surface opposite to the lower surface of the bottom surface of the substrate; a first electrode and a second electrode disposed inside both side surfaces of the recess portion and facing each other; a pixel structure configured to sense heat or infrared light inside the recess portion and embedded in the substrate; and a planarization layer covering the entire upper portion of the substrate.

17 Claims, 10 Drawing Sheets

(56) References Cited

U.S. PATENT DOCUMENTS

| | | | |
|---|---|---|---|
| 11,105,684 B2 | 8/2021 | Tepegoz et al. | |
| 2005/0224714 A1 | 10/2005 | Akin et al. | |
| 2007/0128757 A1* | 6/2007 | Ko | B81C 1/00626 |
| | | | 438/50 |
| 2008/0088221 A1* | 4/2008 | Chung | B81C 1/00396 |
| | | | 313/402 |
| 2012/0318960 A1* | 12/2012 | Ha | H01L 27/14621 |
| | | | 29/829 |
| 2013/0062310 A1* | 3/2013 | Chung | B81C 1/00396 |
| | | | 216/41 |
| 2015/0102372 A1* | 4/2015 | Dehe | H01L 33/44 |
| | | | 257/98 |
| 2015/0308899 A1* | 10/2015 | Buydens | H01L 31/18 |
| | | | 250/338.4 |
| 2017/0016762 A1* | 1/2017 | Van Buggenhout | G01J 5/12 |
| 2017/0261377 A1 | 9/2017 | Alves et al. | |
| 2018/0283956 A1* | 10/2018 | Van Buggenhout | G01J 5/045 |
| 2020/0295065 A1 | 9/2020 | Wu | |
| 2021/0262858 A1* | 8/2021 | Noltemeyer | G01J 3/0291 |
| 2021/0302236 A1* | 9/2021 | Takahashi | H10N 19/00 |
| 2021/0302237 A1* | 9/2021 | Takahashi | H10N 15/00 |
| 2022/0131098 A1* | 4/2022 | Leem | H10K 30/81 |

FOREIGN PATENT DOCUMENTS

| | | |
|---|---|---|
| JP | 5969606 B2 | 8/2016 |
| KR | 1996-0015970 | 5/1996 |
| KR | 10-1528968 B1 | 6/2015 |
| KR | 2019-0049616 A | 5/2019 |

* cited by examiner

SENSOR CONFIGURED TO SENSE HEAT OR INFRARED LIGHT AND ELECTRONIC DEVICE INCLUDING SAME

CROSS-REFERENCE TO RELATED APPLICATION

This application claims priority to and the benefit of Korean Patent Application No. 10-2021-0085174 filed in the Korean Intellectual Property Office on Jun. 29, 2021, the entire contents of which are incorporated herein by reference.

BACKGROUND

1. Field

A sensor configured to sense heat or infrared light and an electronic device including the same are disclosed.

2. Description of the Related Art

An infrared sensor is a device that detects infrared rays emitted from an object and largely classified into a cooled type operating at a liquid nitrogen temperature and an uncooled type operating at room temperature.

The cooled infrared sensor is a device that detects electron-hole pairs generated when a semiconductor material with a small bandgap such as HgCdTe absorbs infrared light, through photoconductors, photodiodes, and photocapacitors. On the other hand, the uncooled infrared sensor is a device that detects changes in electrical conductivity or capacitance due to heat generated when infrared light is absorbed and in general, classified into a pyroelectric type, a thermopile type, and a bolometer-type.

The uncooled type has a disadvantage of lower infrared detection than the cooled type but requires no separate cooling device and thus has advantages of small size, low power consumption, and low price, which open up a wide application range.

SUMMARY

Some example embodiments provide a sensor configured to sense heat or infrared light having improved heat and infrared sensing characteristics and having a reduced pixel size.

Some example embodiments provide an electronic device including the sensor configured to sense heat or infrared light.

According to some example embodiments, a sensor configured to sense heat or infrared light may include a substrate including a recess portion having a bottom portion and opposite side portions connected to opposite ends of the bottom portion, the recess portion having outer surfaces at least partially defining a recess into the substrate, the substrate including one or more inner surfaces at least partially defining a cavity inside the substrate along the bottom portion and the opposite side portions of the recess portion; a lower reflective layer on at least one of an upper surface of the bottom portion of the substrate, a lower surface of the bottom portion of the recess portion of the substrate, or a surface opposite to the lower surface of the bottom portion of the recess portion of the substrate; a first electrode and a second electrode inside opposing inner side surfaces of the recess portion and facing each other; a pixel structure configured to sense heat or infrared light inside the recess portion and embedded in the substrate; and a planarization layer covering an entire upper portion of the substrate.

The cavity may include a plurality of cavities that are connected to each other or are isolated from each other.

A thickness of the cavity along the opposite side portions of the recess portion of the substrate and a thickness of the cavity along the bottom portion of the substrate may be a same thickness or may be different from each other.

A thickness of the cavity along the opposite side portions of the substrate and a thickness of the cavity along the bottom portion of the substrate may be each about 50 nm to about 2000 nm, respectively.

A thickness of the lower reflective layer may be about 2 nm to about 200 nm.

Each of the first electrode and the second electrode may have a thickness of about 3 nm to about 300 nm.

Side metal layers may be further included on opposite side surfaces of the opposite side portions of the recess portion of the substrate. Each of the side metal layers may have a thickness of about 2 nm to about 200 nm.

The pixel structure configured to sense heat or infrared light may include an absorption layer including a heat or infrared sensing polymer; $VO_x$ (x=1.5 to 2.0); TiN; a metal such as titanium (Ti) or nickel-chromium (Ni—Cr); or any combination thereof.

The heat or infrared sensing polymer may include a block copolymer including a first structural unit represented by Chemical Formula 1, a second structural unit represented by Chemical Formula 2, and a third structural unit represented by Chemical Formula 3; and a polyvalent metal ion coordinating with a side chain group of the block copolymer.

[Chemical Formula 1]

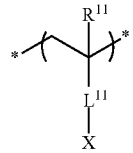

[Chemical Formula 2]

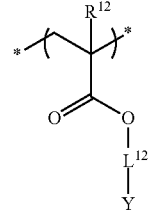

[Chemical Formula 3]

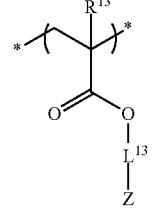

In Chemical Formulas 1 to 3, $R^{11}$, $R^{12}$, and $R^{13}$ are each independently hydrogen or a C1 to C6 alkyl group, $L^{11}$ and $L^{12}$ are each independently a single bond, a substituted or unsubstituted C1 to C10 alkylene group, a C2 to C20 alkylene group in which at least one methylene group is replaced by a linking group of —O—, —S—, —C(=O)—, —S(=O)—, —S (=O)₂—, —C(=O)—O—, —O—C(=O)—, —C(=O)NR—, or any combination thereof, wherein R is hydrogen or a C1 to C6 alkyl group, or a substituted or unsubstituted C6 to C10 arylene group, $L^{13}$ is a single bond, a substituted or unsubstituted C1 to C20 alkylene group, a substituted or unsubstituted C3 to C20 cycloalkylene group, or a substituted or unsubstituted C6 to C20 arylene group, X is a carboxyl group (—COOH), a sulfonic acid group (—S(=O)₂OH), or a phosphoric acid group (—O—P(=O)(OH)₂), Y is a hydroxy group (—OH), an alkoxy group (—OR, wherein R is a linear or branched C1 to C10 alkyl group), an ester group (C(=O)OR, wherein R is a linear or branched C1 to C10 alkyl group), a sulfonate ester group (—S(=O)₂OR, wherein R is a linear or branched C1 to C10 alkyl group), a phosphoric acid ester group (—O—P(=O)(OR)₂, wherein R is a linear or branched C1 to C10 alkyl group), an amine group, an isocyanate group (—N=C=O), or an urethane group (—NHC(=O)OR, wherein R is a linear or branched C1 to C10 alkyl group), and Z is a substituted or unsubstituted linear or branched C1 to C20 alkyl group, a substituted or unsubstituted C6 to C30 aryl group, a substituted or unsubstituted C3 to C30 heteroaryl group, a substituted or unsubstituted C3 to C30 cycloalkyl group, or a substituted or unsubstituted C3 to C30 heterocycloalkyl group.

In the block copolymer, a sum amount of the first structural unit and the second structural unit may be about 2 moles to about 50 moles based on 100 moles of the third structural unit.

The pixel structure configured to sense heat or infrared light may include a first absorption layer including $VO_x$ (x is 1.5 to 2.0); TIN; a metal such as titanium (Ti), or nickel-chromium (Ni—Cr); or any combination thereof and a second absorption layer including a heat or infrared sensing polymer.

The pixel structure configured to sense heat or infrared light may be a multi-layered structure including a resistive layer, an insulating layer, and an absorption layer.

The sensor configured to sense heat or infrared light may further include a protective layer between the pixel structure and the planarization layer.

The pixel structure configured to sense heat or infrared light may be a multi-layered structure including a resistive layer, an insulating layer, and an absorption layer.

The sensor configured to sense heat or infrared light may further include a pair of microlens on the planarization layer.

The sensor configured to sense heat or infrared light may further include a support inside the cavity along the bottom surface of the substrate.

According to some example embodiments, an electronic device including a sensor configured to sense heat or infrared light is provided.

The sensor configured to sense heat or infrared light may provide a high-resolution sensor because it may realize a pixel size of less than or equal to about 5 µm, for example, about 0.6 µm to about 2 µm, while having excellent heat and infrared sensing characteristics.

DETAILED DESCRIPTION

Figure 1:
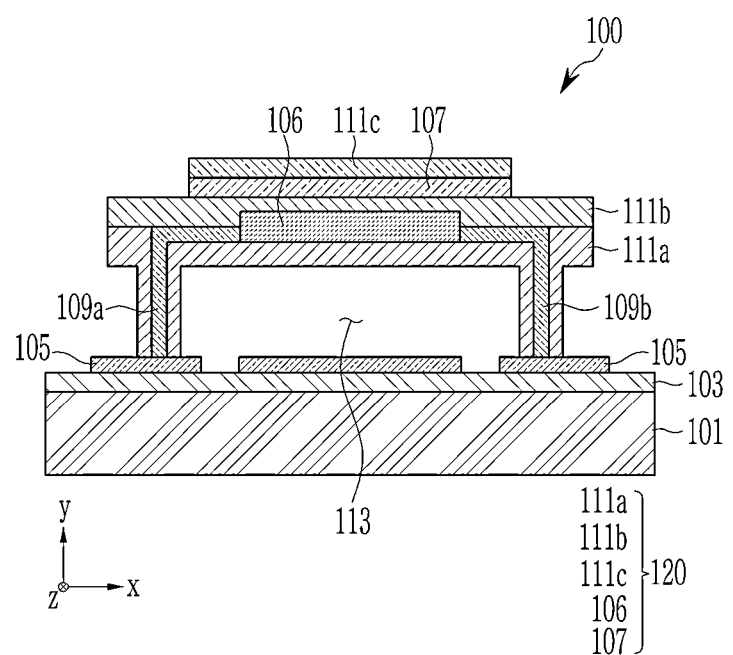
FIG. 1 is a schematic cross-sectional view of a microbolometer according to some example embodiments.

Advantages and characteristics of the inventive concepts, and a method for achieving the same, will become evident referring to the following example embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined. Terms defined in a commonly used dictionary may be interpreted as having meanings consistent with their meanings in the related technical field and the context of the present specification, and may not be interpreted as idealized and excessively formal meanings, unless specifically defined herein. In addition, unless explicitly described to the contrary, the word "comprise", and variations such as "comprises" or "comprising", will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present such that the element and the other element are isolated from direct contact with each other by one or more interposing spaces and/or structures. In contrast, when an element is referred to as being "directly on" another element, there are no intervening elements present such that the element and the other element are in direct contact with each other. As described herein, an element that is "on" another element may be above, beneath, and/or horizontally adjacent to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, elements that are described to be in contact with other elements may be understood to be in "direct" contact with the other elements.

As described herein, an element that is described to be "spaced apart" from another element, in general and/or in a particular direction (e.g., vertically spaced apart, laterally spaced apart, etc.) may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) may be understood to be isolated from direct contact with each other, in general and/or in the particular direction (e.g., isolated from direct contact with each other in a vertical direction, isolated from direct contact with each other in a lateral or horizontal direction, etc.).

In the drawings, the thickness is enlarged to clearly represent various layers and regions. The same reference numerals are used for similar portions throughout the specification.

In the present specification, when a first element such as a layer, film, region, plate, etc. is said to be "on" the second element, this includes not only the case of being "directly on" the other portion but also another portion in the middle. In contrast, when an element is referred to as being "directly on" another element, there are no intervening elements present.

As used herein, when a definition is not otherwise provided, "substituted" refer to replacement of hydrogen of a compound or a functional group by a substituent selected from a halogen atom, a hydroxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C1 to C20 alkoxy group, a C1 to C20 haloalkyl group, a C2 to C20 alkenyl group, a C2 to C20 alkynyl group, a C6 to C30 aryl group, a C7 to C30 arylalkyl group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and any combination thereof.

In addition, when a definition is not otherwise provided, "hetero" means that one or three heteroatoms selected from N, O, S, Si, Se, Te, and P are included in a given group or compound.

Hereinafter, "combination" includes two or more mixing, two or more lamination structures, or inter-substitution.

Hereinafter, a microbolometer is described as an example of an uncooled sensor configured to sense heat or infrared light. Among the uncooled sensors configured to sense heat or infrared light, the microbolometer that is currently most commonly used senses heat or infrared light by sensing an increase in resistance in a metal thin film such as titanium (Ti) by heat (or heat generated when infrared is absorbed) or vanadium oxide ($VO_x$, x=1.5 to 2.0), or by sensing a decrease in resistance in a semiconductor thin film such as amorphous Si.

The pixel structure configured to sense heat or infrared light included in the microbolometer mainly has a structure levitated from the substrate in order to eliminate thermal noise caused by the heat of the substrate, and may include absorption layer configured to absorb heat or infrared light and a thermal sensing element that changes its resistance value by sensing a change in heat, that is, has a large temperature coefficient of resistance (TCR).

Hereinafter, a microbolometer (e.g., a conventional microbolometer) including a pixel structure configured to sense heat or infrared light is described with reference to FIG. 1. FIG. 1 is a schematic cross-sectional view of a microbolometer including a pixel structure (e.g., a conventional pixel structure) configured to sense heat or infrared light (hereinafter also referred to as a "pixel structure") according to some example embodiments.

Referring to FIG. 1, the microbolometer 100 includes a substrate 101 including a detection circuit (not shown) and a pixel structure 120 configured to sense heat or infrared light, which is levitated with a space of $\lambda/4$ (wherein, $\lambda$ is the infrared wavelength to be detected and is generally about 1 µm to about 20 µm) from the substrate 101.

Both ends of the pixel structure 120 are connected to the substrate 101 by metal electrodes 109a and 109b. A metal pattern 105 made of an aluminum material is disposed on the surface of an insulating layer 103 of the substrate 101, which is electrically connected to the detection circuit (not shown).

The pixel structure 120 includes a resistive layer 106 and an absorption layer 107, which are separated by an insulating layer 111b, and insulating layers 111a and 111c are respectively disposed under the resistive layer 106 and on the absorption layer 107.

Both ends of the resistance layer 106 are connected to the metal pattern 105 by metal electrodes 109a and 109b, and are connected to a detection circuit (not shown) in the substrate 101 through this.

In particular, recently, interest in microbolometer arrays in which the size of a unit pixel is reduced is increasing. A microbolometer array with a reduced pixel size may increase the number of chips per wafer, may image heat or infrared with high resolution, and may be mounted on miniaturized equipment, and above all, the manufacturing cost may be lowered.

On the other hand, in order to increase an absorption rate of reflected infrared light by optical resonance, in general, a height of the optical resonance unit (air-gap, 113) between the substrate 101 and the resistance layer 106 should be maintained to be $\lambda/4$ (wherein, $\lambda$ is the infrared wavelength to be detected and is generally about 1 µm to about 20 µm). However, when the pixel size is reduced in the structure shown in FIG. 1, the gap between the first metal electrode 109a and the second metal electrode 109b supporting the pixel structure 120 should also be narrowed, so that an aspect ratio of the pixel structure 120 may be increased while maintaining the heights of the metal electrodes 109a and 109b as they are and narrowing the gap between the metal electrodes 109a and 109b, which may cause many problems in the manufacturing process of the microbolometer array. Accordingly, in the structure shown in FIG. 1, there is a limitation in reducing the pixel size, and there has been no report of reducing the pixel size to about 12 µm or less so far.

In order to solve the above problems, a pixel structure configured to sense heat or infrared light is embedded in a substrate, and cavities are formed in both side surfaces and a bottom portion of the substrate according to the shape of the recess portion in which the pixel structure is present. By having such a structure, the pixel size may be reduced to about 5 µm or less, for example, from about 0.6 µm to about 2 µm while maintaining the mechanical strength of the sensor configured to sense heat or infrared light.

Hereinafter, a microbolometer including a pixel structure configured to sense heat or infrared light according to some example embodiments is described with reference to FIG. 2.

Figure 2:
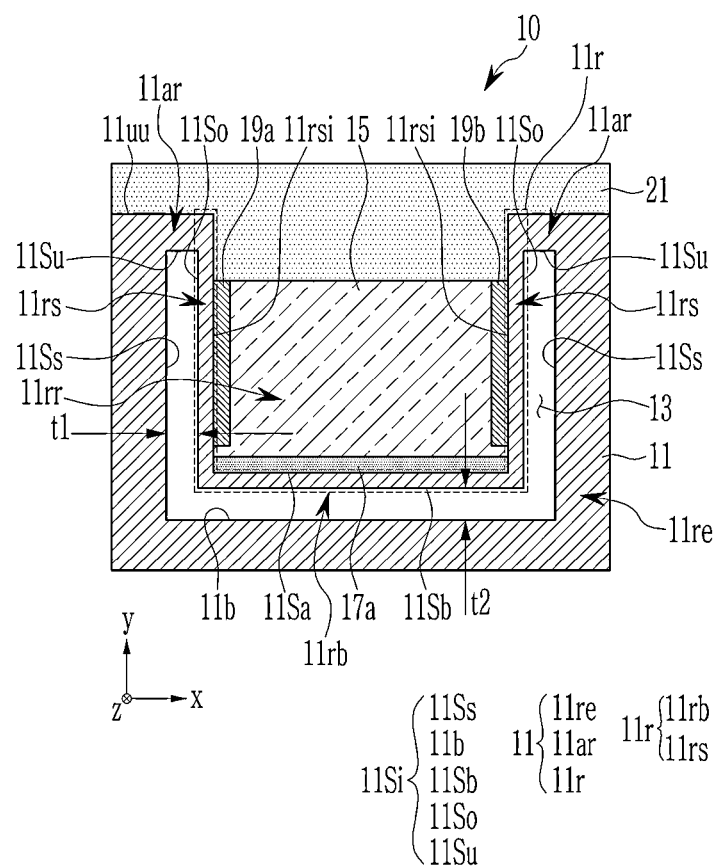
FIG. 2 is a schematic cross-sectional view of a microbolometer according to some example embodiments.

FIG. 2 is a schematic cross-sectional view of a microbolometer according to some example embodiments.

Referring to FIG. 2, a microbolometer 10 according to some example embodiments includes a substrate 11 including a recess portion 11r (also referred to as a recess structure); a cavity 13 disposed inside the substrate along a bottom portion 11rb (also referred to as a bottom structure) and both (e.g., opposing) side portions 11rs (also referred to as side structures) of the substrate 11; a lower reflective layer 17a disposed on the upper surface 11Sa of the substrate 11 on the upper portion of the cavity 13; a first electrode 19a and a second electrode 19b inside both (e.g., opposing) side surfaces (e.g., inner side surfaces 11rsi) of the recess portion 11r and facing each other; a pixel structure 15 configured to sense heat or infrared light which are disposed inside the recess portion 11r (e.g., within the recess 11rr at least partially defined by the recess portion 11r) and includes a heat or infrared absorption layer embedded in the substrate; and a planarization layer 21 covering the entire upper portion of the substrate 11. As shown, the substrate 11 may include a recess portion 11r having a bottom portion 11rb and opposite side portions 11rs connected to opposite ends of the bottom portion 11rb, where the recess portion 11r has outer surfaces (upper surface 11Sa and opposing inner side surfaces 11rsi) at least partially defining a recess 11rr into the substrate 11 (e.g., into the volume space defined by outermost surfaces such as uppermost surface 11uu of the substrate 11). As shown, the recess portion 11r may be at least partially spaced apart from a remainder portion 11re of the substrate 11 so that the recess portion 11r, while partially connected to the remainder portion 11re via support portions 11ar, collectively with the remainder portion 11re define a cavity 13 therebetween. As shown, the substrate 11 may include one or more inner surfaces 11Si at least partially defining a cavity 13 inside the substrate 11 (e.g., the cavity 13 is within a volume space defined by outermost surfaces of the substrate 11 and/or the cavity 13 is isolated from an exterior of the substrate 11) where the cavity extends along (e.g., is at least partially defined by surfaces 11So and 11Sb of) the bottom portion 11rb and the opposite side portions 11rs of the recess portion 11r.

The substrate 11 including the recess portion 11r may be made of semiconductor silicon, glass, or a polymer, and the substrate 11 may include a detection circuit. The detection circuit may be generally implemented with a complementary metal-oxide semiconductor (CMOS). Examples of the polymer may be made of polyethylene terephthalate, polyethylene naphthalate, polycarbonate, polyacrylate, polyimide, or any combination thereof, but are not limited thereto.

The cavity 13 may be formed in the substrate 11 along the recess portion 11r of the substrate 11 (e.g., at least partially defined by opposite outer side surfaces 11So and lower surface 11Sb of the side portions 11rs and bottom portion 11rb of the recess portion 11r of the substrate 11, which may be spaced apart from at least inner side surfaces 11Ss and bottom surface 11b of the substrate 11 based on the recess portion 11r being spaced apart from a remainder portion 11re of the substrate 11 except for support portions 11ar connecting the recess portion 11r to the remainder portion 11re of the substrate 11, wherein the recess portion 11r and the remainder portion 11re of the substrate 11 are on opposite sides of, and define opposing surfaces of, the cavity 13. Multiple cavities 13 may be formed and may be connected to each other or may be formed independently from each other. As shown, the cavity 13 may include side cavity portions at least partially defined horizontally between respective pairs of surfaces 11So and 11Ss and vertically between surfaces 11b and 11Su, and a bottom cavity portion horizontally between the side cavity portions and at least partially defined vertically between surfaces 11b and 11Sb. The cavity 13 may be formed by an etching process using a photoresist, and such a process is well known in the art. The inside of the cavity 13 is maintained by air or vacuum, and may block an inflow of surrounding heat. A side metal layer, which will be described later, which can block the inflow of surrounding heat, may be disposed inside the cavity 13, so that a structure capable of effectively blocking heat without affecting the size of the pixel may be provided.

A thickness t1 (e.g., horizontal thickness between opposing surfaces 11Ss and 11So of the substrate 11) of the cavity 13 on both (e.g., opposite) side portions 11rs and a thickness t2 (e.g., vertical thickness between opposing surfaces 11b and 11Sb of the substrate 11) of the cavity 13 on the bottom portion 11rb may be the same as or different from each other. In some example embodiments, the thickness t1 of the cavity 13 on both side portions may be greater than or equal to about 50 nm, greater than or equal to about 51 nm, greater than or equal to about 52 nm, greater than or equal to about 53 nm, greater than or equal to about 54 nm, or greater than or equal to about 55 nm and less than or equal to about 2000 nm, less than or equal to about 1999 nm, less than or equal to about 1998 nm, less than or equal to about 1997 nm, less than or equal to about 1996 nm, or less than or equal to about 1995 nm. For example, the thickness t1 of the cavity 13 on both side portions may be less than or equal to about 1000 nm, less than or equal to about 999 nm, less than or equal to about 998 nm, less than or equal to about 997 nm, less than or equal to about 996 nm, or less than or equal to about 995 nm. The thickness t2 of the cavity 13 on the bottom portion may be greater than or equal to about 50 nm, greater than or equal to about 51 nm, greater than or equal to about 52 nm, greater than or equal to about 53 nm, greater than or equal to about 54 nm, or greater than or equal to about 55 nm and less than or equal to about 2000 nm, less than or equal to about 1999 nm, less than or equal to about 1998 nm, less than or equal to about 1997 nm, less than or equal to about 1996 nm, or less than or equal to about 1995 nm. For example, the thickness t2 of the cavity 13 on the bottom surface may be less than or equal to about 1500 nm, less than or equal to about 1499 nm, less than or equal to about 1498 nm, less than or equal to about 1497 nm, less than or equal to about 1496 nm, or less than or equal to about 1495 nm. When the thicknesses t1 and t2 of the cavity 13 are within the above ranges, heat insulation and durability of the pixel structure may be easily secured.

The bottom portion 11rb of the substrate 11 on the upper portion of the cavity 13 may be a portion of the substrate 11 (e.g., a part of the recess portion 11r) that has an upper surface 11Sa and a lower surface 11Sb, and a lower reflective layer 17a is formed on the upper surface 11Sa. The lower reflective layer 17a may include a metal such as aluminum (Al), gold (Au), silver (Ag), or copper (Cu), but is not limited thereto. A thickness of the lower reflective layer 17a may be greater than or equal to 2 nm, for example greater than or equal to about 3 nm, greater than or equal to about 4 nm, greater than or equal to about 5 nm, greater than or equal to about 6 nm, greater than or equal to about 7 nm, greater than or equal to about 8 nm, greater than or equal to about 9 nm, or greater than or equal to 10 nm and less than or equal to about 200 nm, less than or equal to about 199 nm, less than or equal to about 198 nm, less than or equal to about 197 nm, less than or equal to about 196 nm, or less than or equal to about 195 nm. In some example embodiments, the thickness of the lower reflective layer 17a may be less than or equal to about 100 nm, less than or equal to about 99 nm, less than or equal to about 98 nm, less than or equal to about 97 nm, less than or equal to about 96 nm, or less than or equal to about 95 nm. Within the above ranges, heat or infrared light passing through the pixel structure 15 configured to sense heat or infrared light may be effectively reflected to be supplied to the pixel structure 15 configured to sense heat or infrared light.

The first electrode 19a and the second electrode 19b may be formed inside both side portions 11rs of the recess portion 11r and may face each other. For example, as shown in FIG. 2, the first electrode 19a and the second electrode 19b may be formed on respective inner side surfaces 11rsi of separate, opposing side portions 11rs of the recess portion 11r and may face each other (e.g., may face each other across the recess 11rr). The first electrode 19a and the second electrode 19b may be connected to the detection circuit of the substrate 11 by respective conductive wires drawn out therefrom. Each of the conductive wires drawn out from the first electrode 19a and the second electrode 19b may be disposed to pass through the cavities 13 disposed on both side surfaces of the substrate, so that the influence of heat may be reduced or minimized.

The first electrode 19a and the second electrode 19b may include a metal such as gold (Au), titanium (Ti), copper (Cu), silver (Ag), or aluminum (Al). Thicknesses of the first electrode 19a and second electrode 19b may be each greater than or equal to about 3 nm, greater than or equal to about 4 nm, greater than or equal to about 5 nm, or greater than or equal to about 6 nm and less than or equal to about 300 nm, less than or equal to about 290 nm, less than or equal to about 280 nm, less than or equal to about 270 nm, less than or equal to about 260 nm, or less than or equal to about 250 nm.

By embedding and disposing the pixel structure 15 configured to sense heat or infrared light in the recess portion 11r of the substrate 11 (e.g., in the recess 11rr at least partially defined by the recess portion 11r) and arranging the cavity 13 around the pixel structure 15, the pixel size may be reduced as desired without structural problems and heat flowing into the pixel structure 15 configured to sense heat or infrared light may be effectively blocked.

The pixel structure 15 configured to sense heat or infrared light may include an absorption layer capable of absorbing heat or infrared light to detect it. The thickness of the absorption layer may be $\lambda/4$ (wherein, $\lambda$ is the infrared wavelength to be detected and is generally about 1 μm to about 20 μm). The absorption layer may include a heat or infrared sensing material that is a heat or infrared sensing polymer; $VO_x$ (x=1.5 to 2.0); TIN; metals such as titanium (Ti) or nickel-chromium (Ni—Cr); or any combination thereof, but is not limited thereto.

The pixel structure 15 configured to sense heat or infrared light may include a plurality of absorption layers including different or the same heat or infrared sensing materials. For example, the pixel structure 15 configured to sense heat or infrared light may include a first absorption layer including a heat or infrared sensing material of $VO_x$ (x=1.5 to 2.0); TIN; metals such as titanium (Ti) or nickel-chromium (Ni—Cr); or any combination thereof, and a second absorption layer including the heat or infrared sensing polymer.

The heat or infrared sensing polymer may include a block copolymer including a first structural unit represented by Chemical Formula 1, a second structural unit represented by Chemical Formula 2, and a third structural unit represented by Chemical Formula 3; and a polyvalent metal ion coordinating with the side chain group of the block copolymer.

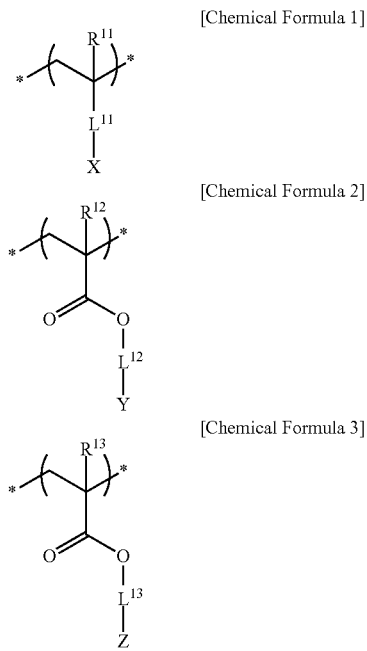

In Chemical Formulas 1 to 3, $R^{11}$, $R^{12}$, and $R^{13}$ are each independently hydrogen or a C1 to C6 alkyl group, $L^{11}$ and $L^{12}$ are each independently a single bond, a substituted or unsubstituted C1 to C10 alkylene group, a C2 to C20 alkylene group in which at least one methylene group is replaced by a linking group of —O—, —S—, —C(=O)—, —S(=O)—, —S(=O)$_2$—, —C(=O)—O—, —O—C(=O)—, —C(=O)NR—, or any combination thereof, wherein R is hydrogen or a C1 to C6 alkyl group, or a substituted or unsubstituted C6 to C10 arylene group, $L^{13}$ is a single bond, a substituted or unsubstituted C1 to C20 alkylene group, a substituted or unsubstituted C3 to C20 cycloalkylene group, or a substituted or unsubstituted C6 to C20 arylene group, X is a carboxyl group (—COOH), a sulfonic acid group (—S(=O)$_2$OH), or a phosphoric acid group (—O—P(=O)(OH)$_2$), Y is a hydroxy group (—OH), an alkoxy group (—OR, wherein R is a linear or branched C1 to C10 alkyl group), an ester group (C(=O)OR, wherein R is a linear or branched C1 to C10 alkyl group), a sulfonate ester group (—S(=O)$_2$OR, wherein R is a linear or branched C1 to C10 alkyl group), a phosphoric acid ester group (—O—P(=O)(OR)$_2$, wherein R is a linear or branched C1 to C10 alkyl group), an amine group, an isocyanate group (—N=C=O), or an urethane group (—NHC(=O)OR, wherein R is a linear or branched C1 to C10 alkyl group), and Z is a substituted or unsubstituted linear or branched C1 to C20 alkyl group, a substituted or unsubstituted C6 to C30 aryl group, a substituted or unsubstituted C3 to C30 heteroaryl group, a substituted or unsubstituted C3 to C30 cycloalkyl group, or a substituted or unsubstituted C3 to C30 heterocycloalkyl group.

The block copolymer may include a hydrophilic block (A) and a hydrophobic block (B), and may further include a linking group (L) of trithiocarbonate, dithiocarbonate, xanthate, or any combination thereof between the hydrophilic block (A) and the hydrophobic block (B).

In the block copolymer, the hydrophilic block (A) and the hydrophobic block (B) may exist symmetrically or asymmetrically with respect to the linking group (L).

The hydrophilic block (A) may include two or more first structural units and two or more second structural units, which may be in the form of block copolymerization, random copolymerization, or alternating copolymerization, respectively. The hydrophobic block (B) may include two or more third structural units, which may be in the form of block copolymerization, random copolymerization, or alternating copolymerization.

In the block copolymer, a sum amount of the first structural unit and the second structural unit may be about 2 moles to about 50 moles based on 100 moles of the third structural unit. That is, the hydrophilic block (A) may be included in an amount of about 2 moles to about 50 moles based on 100 moles of the hydrophobic block (B). In some example embodiments, a sum amount of the first structural unit and the second structural unit may be greater than or equal to about 2.5 moles, greater than or equal to about 3 moles, greater than or equal to about 3.5 moles, greater than or equal to about 4 moles, greater than or equal to about 4.5 moles, or greater than or equal to about 5 moles and less than or equal to about 49 moles, less than or equal to about 48 moles, less than or equal to about 47 moles, less than or equal to about 46 moles, less than or equal to about 45 moles, less than or equal to about 44 moles, less than or equal to about 43 moles, less than or equal to about 42 moles, less than or equal to about 41 moles, or less than or equal to about 40 moles based on 100 moles of the third structural unit. Within the above ranges, absorption properties of the heat or infrared sensing polymer may be improved.

The block copolymer may have a weight average molecular weight (Mw) of greater than or equal to about 5,000, for example greater than or equal to about 6000, greater than or equal to about 7000, greater than or equal to about 8000, greater than or equal to about 9000, or greater than or equal to about 10000 and less than or equal to about 1,500,000, for example less than or equal to about 1,600,000, less than or equal to about 1,700,000, less than or equal to about 1,800,000, less than or equal to about 1,900,000, or less than or equal to about 2,000,000. Within the above ranges, coating properties of composition for manufacturing a composite configured to sense heat or infrared light may be easily controlled. The weight average molecular weight of the block copolymer may be measured by a gel permeation chromatography (hereinafter referred to as "GPC") method and may be reduced to polystyrene.

The block copolymer may be included in an amount of greater than or equal to about 20 volume % and less than or equal to about 99.9 volume % based on the total volume of the absorption layer. In some example embodiments, the polymer may be included in an amount of greater than or equal to about 70 volume % and less than or equal to about 99 volume % based on the total volume of the absorption layer. In some example embodiments, the polymer may be included in an amount of greater than or equal to about 20 volume % and less than or equal to about 50 volume % based on the total volume of the absorption layer. Within the above ranges, the heat or infrared absorption properties of the absorption layer may be easily controlled.

The polyvalent metal ion may be a divalent or higher metal ion. Specific examples of the polyvalent metal ion may include an ion of a metal of Ca, Al, Cu, Co, Ba, Zn, Fe, Mn, Mg, Sr, Ba, Cr, Ti, Zr, Mo, V, or combinations thereof.

The polyvalent metal ion may be included in an amount of greater than or equal to about 0.1 volume % and less than or equal to about 80 volume % based on the total volume of the absorption layer. In some example embodiments, the polyvalent metal ion may be included in an amount of greater than or equal to about 1 volume % and less than or equal to about 30 volume % based on the total volume of the absorption layer. In some example embodiments, the polyvalent metal ion may be included in an amount of greater than or equal to about 50 volume % and less than or equal to about 80 volume % based on the total volume of the absorption layer. Within the above ranges, the heat or infrared absorption properties of the absorption layer may be easily controlled.

The absorption layer may further include a reinforcing agent for improving mechanical properties, and the reinforcing agent may include graphite, carbon nanotubes, graphene, graphite nanoplates, fullerene, fullerene derivatives, quantum dots, metal oxides (e.g., silica, alumina ($Al_2O_3$), titania ($TiO_2$), zirconia ($ZrO_2$), ZnO, $SnO_2$, $Sb_2O_3$, boehmite, indium tin oxide (ITO), etc.) or any combination thereof. In some example embodiments, the reinforcing agent may be spherical.

For example, the quantum dot may be a Group II-VI semiconductor compound, a Group III-V semiconductor compound, a Group IV-VI semiconductor compound, a Group IV semiconductor compound, a Group I-III-VI semiconductor compound, or a Group I-II-IV-VI semiconductor compound, a Group II-III-V semiconductor compound, or any combination thereof.

The reinforcing agent may be included in an amount of less than or equal to about 5 volume % based on the total volume of the absorption layer.

The absorption layer may have a different manufacturing process according to the material forming the absorption layer. When the absorption layer includes a polymer, it may be formed by injecting a composition obtained by dissolving or dispersing the polymer in a solvent into the recess portion of the substrate 11 and then removing the solvent.

The planarization layer 21 may be disposed on the pixel structure 15. The planarization layer 21 may be formed of a photocurable polymer (self-leveling polymer), and the photocurable polymer may include a polymer including a photocurable functional group such as an acrylate group, a methacrylate group, a hydroxyl group, a carboxyl group, or a vinyl group. A thickness of the planarization layer 21 may be greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, greater than or equal to about 900 nm, or greater than or equal to about 1 μm and less than or equal to about 2 μm, less than or equal to about 1.9 μm, less than or equal to about 1.8 μm, less than or equal to about 1.7 μm, or less than or equal to about 1.6 μm. The planarization layer 21 may cover the upper portion of the substrate 11 and the entire upper portion of the pixel structure 15, and may form a pixel array by connecting two or more pixel structures configured to sense heat or infrared light.

The protective layer may be further disposed between the pixel structure 15 and the planarization layer 21. The protective layer may include oxide, nitride, oxynitride, or any combination thereof, and examples of the oxide may include titanium oxide, silicon oxide, zirconium oxide, and the like. The thickness of the protective layer may be in the range of about 3 nm to about 10 nm.

A microlens may be disposed on the planarization layer 21. The microlens serves to condense light from the outside. The microlens may have a hemispherical shape, but is not limited thereto.

The microbolometer 10 shown in FIG. 2 may further include a side metal layer inside the cavity 13. This structure is shown in FIG. 3.

Figure 3:
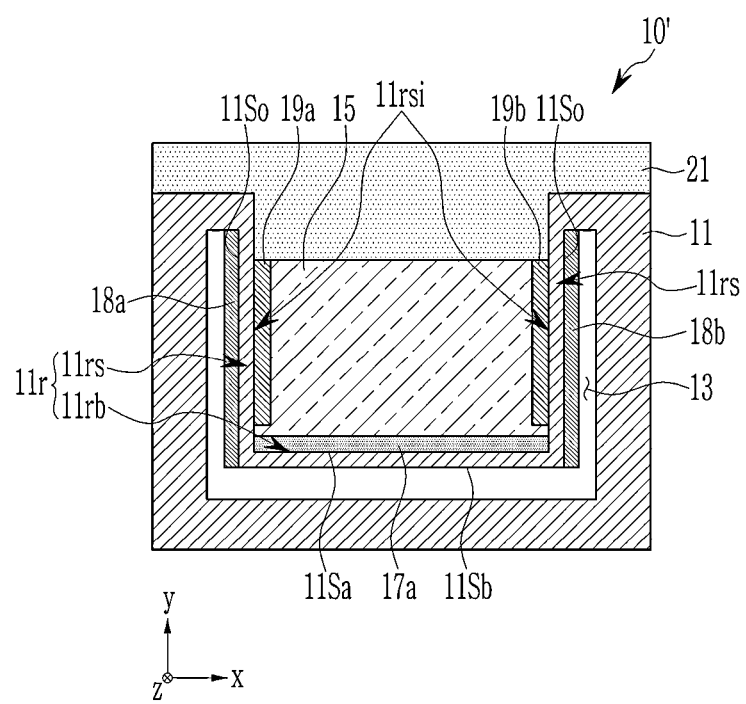
FIG. 3 is a schematic cross-sectional view of a microbolometer according to some example embodiments.

FIG. 3 is a schematic cross-sectional view of a microbolometer according to some example embodiments. Referring to FIG. 3, a microbolometer 10' according to some example embodiments includes a substrate 11 including a recess portion 11r; a cavity 13 disposed inside the substrate along a bottom portion 11rb and both side portions 11rs of the recess portion 11r of the substrate 11; a lower reflective layer 17a disposed on the upper surface 11Sa of the substrate 11 on the upper portion of the cavity 13; a first electrode 19a and a second electrode 19b inside both inner side surfaces 11rsi of the recess portion 11r and facing each other; a pixel structure 15 configured to sense heat or infrared light which are disposed inside the recess portion 11r and includes a heat or infrared absorption layer embedded in the substrate 11; and a planarization layer 21 covering the entire upper portion of the substrate 11, like some example embodiments, including the example embodiments shown in FIG. 2. The microbolometer 10' may further include side metal layers 18a and 18b inside the cavity 13, unlike some example embodiments, including the example embodiments shown in FIG. 2. As shown, the side metal layers 18a and 18b may be on opposite outer side surfaces 11So of the side portions 11rs of the recess portion 11r of the substrate 11, so that the side metal layers 18a and 18b are inside the cavity 13 and facing away from the recess portion 11r.

The side metal layers 18a and 18b may effectively block heat or heat transferred to the pixel structure 15 configured to sense heat or infrared light. The side metal layers 18a and 18b may include a metal such as aluminum (Al), gold (Au), silver (Ag), or copper (Cu). Thicknesses of the side metal layers 18a and 18b may be greater than or equal to about 2 nm, for example greater than or equal to about 3 nm, greater than or equal to about 4 nm, greater than or equal to about 5 nm, greater than or equal to about 6 nm, greater than or equal to about 7 nm, greater than or equal to about 8 nm, greater than or equal to about 9 nm, or greater than or equal to about 10 nm and less than or equal to about 200 nm, for example less than or equal to about 199 nm, less than or equal to about 198 nm, less than or equal to about 197 nm, less than or equal to about 196 nm, or less than or equal to about 195 nm. In some example embodiments, the thicknesses of the side metal layers 18a and 18b may be less than or equal to about 100 nm, less than or equal to about 99 nm, less than or equal to about 98 nm, less than or equal to about 97 nm, less than or equal to about 96 nm, or less than or equal to about 95 nm. Within the above ranges, heat or heat transferred to the pixel structure 15 configured to sense heat or infrared light may be blocked to reduce thermal noise.

In some example embodiments, the lower reflective layer may be disposed on the lower surface 11Sb of the bottom portion 11rb of the substrate (substrate disposed on top of the lower cavity). This structure is shown in FIG. 4.

Figure 4:
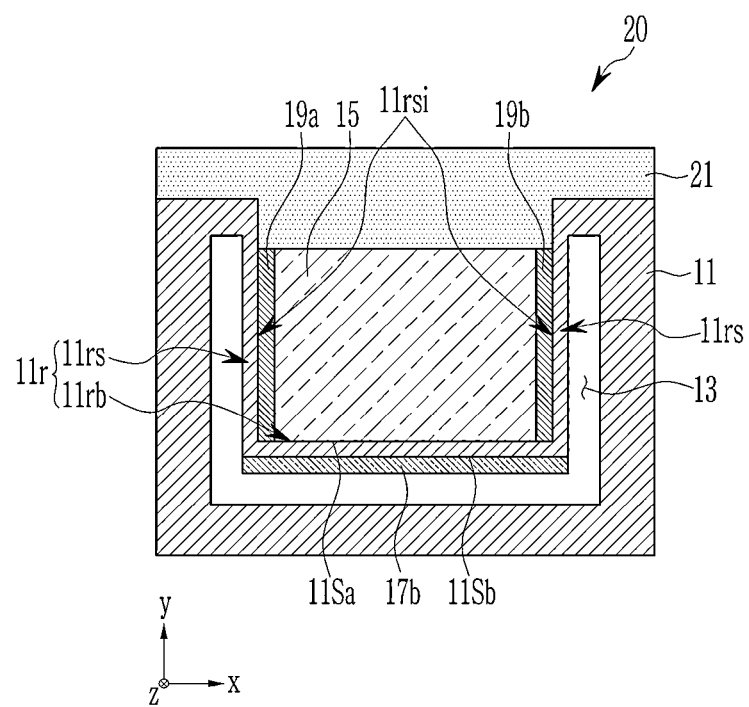
FIG. 4 is a schematic cross-sectional view of a microbolometer according to some example embodiments.

FIG. 4 is a schematic cross-sectional view of a microbolometer according to some example embodiments.

Referring to FIG. 4, a microbolometer 20 according to some example embodiments includes a substrate 11 including a recess portion 11r; a cavity 13 disposed inside the substrate 11 along a bottom portion 11rb and both side portions 11rs of the recess portion 11r of the substrate 11; a lower reflective layer 17b disposed on the lower surface 11Sb of the substrate 11 on the upper portion of the cavity 13; a first electrode 19a and a second electrode 19b inside both inner side surfaces 11rsi of the recess portion 11r and facing each other; a pixel structure 15 configured to sense heat or infrared light inside the recess portion 11r (e.g., inside the recess 11rr) and embedded in the substrate 1; and a planarization layer 21 covering the entire upper portion of the substrate 11.

The microbolometer 20 shown in FIG. 4 has the same configuration as the illustrated microbolometer 10 shown in FIG. 2 except that the lower reflective layer 17b is formed on the lower surface 11Sb of the bottom portion 11rb of the substrate 11 (disposed on the upper portion of the lower cavity 13). The lower reflective layer 17b may include a metal such as aluminum (Al), gold (Au), silver (Ag), or copper (Cu), but is not limited thereto. A thickness of the lower reflective layer 17b may be greater than or equal to about 2 nm, for example greater than or equal to about 3 nm, greater than or equal to about 4 nm, greater than or equal to about 5 nm, greater than or equal to about 6 nm, greater than or equal to about 7 nm, greater than or equal to about 8 nm, greater than or equal to about 9 nm, or greater than or equal to 10 nm and less than or equal to about 200 nm, less than or equal to about 199 nm, less than or equal to about 198 nm, less than or equal to about 197 nm, less than or equal to about 196 nm, or less than or equal to about 195 nm. In some example embodiments, the thickness of the lower reflective layer 17b may be less than or equal to about 100 nm, less than or equal to about 99 nm, less than or equal to about 98 nm, less than or equal to about 97 nm, less than or equal to about 96 nm, or less than or equal to about 95 nm. Within the above ranges, heat or infrared light passing through the pixel structure 15 configured to sense heat or infrared light may be effectively reflected to be supplied to the pixel structure 15 configured to sense heat or infrared light.

In some example embodiments, the lower reflective layer may be disposed on the upper surface of the substrate (disposed under the cavity formed in the bottom surface of the substrate). This structure is shown in FIG. 5.

Figure 5:
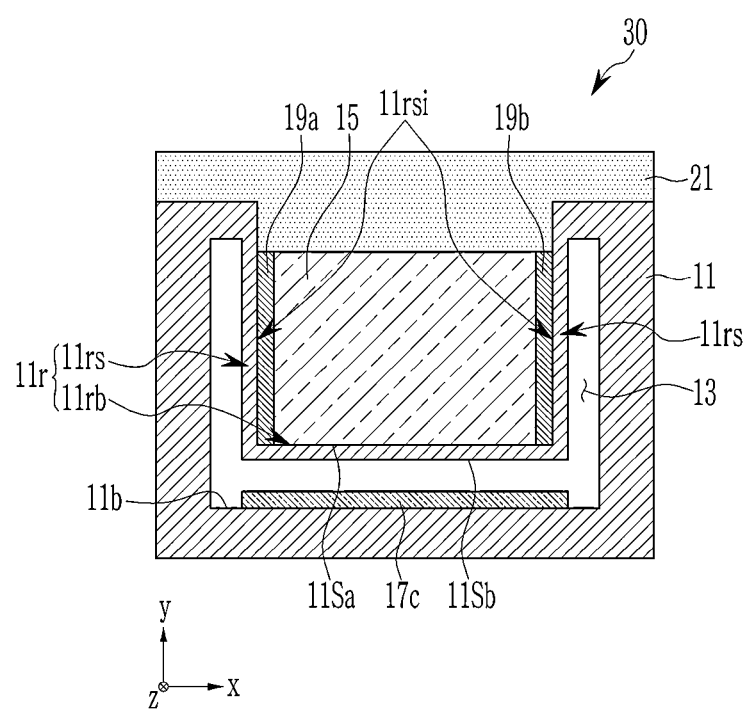
FIG. 5 is a schematic cross-sectional view of a microbolometer according to some example embodiments.

FIG. 5 is a schematic cross-sectional view of a microbolometer according to some example embodiments. Referring to FIG. 5, a microbolometer 30 according to some example embodiments includes a substrate 11 including a recess portion 11r; a cavity 13 disposed inside the substrate along a bottom portion 11rb and opposite side portions 11rs of the substrate 11; a lower reflective layer 17c disposed on a surface (e.g., bottom surface 11b) opposite to the lower surface of the bottom portion 11rb of the substrate 11 (a lower reflective layer 17c is disposed on the substrate under the cavity formed on the bottom surface 11b of the substrate 11); a first electrode 19a and a second electrode 19b inside both inner side surfaces 11rsi of the recess portion 11r and facing each other; a pixel structure configured to sense heat or infrared light inside the recess portion 11r and embedded in the substrate 11; and a planarization layer 21 covering the entire upper portion of the substrate 11. The microbolometer 30 shown in FIG. 5 has the same configuration as the microbolometer 10 shown in FIG. 2 except that the lower reflective layer 17c is formed on the surface of the upper surface of the substrate 11 (e.g., bottom surface 11b, which is disposed under the lower cavity 13 and defines at least a bottom boundary of the lower cavity 13).

The lower reflective layer 17b may include a metal such as aluminum (Al), gold (Au), silver (Ag), or copper (Cu), but is not limited thereto. A thickness of the lower reflective layer 17c may be greater than or equal to 2 nm, for example greater than or equal to about 3 nm, greater than or equal to about 4 nm, greater than or equal to about 5 nm, greater than or equal to about 6 nm, greater than or equal to about 7 nm, greater than or equal to about 8 nm, greater than or equal to about 9 nm, or greater than or equal to 10 nm and less than or equal to about 200 nm, less than or equal to about 199 nm, less than or equal to about 198 nm, less than or equal to about 197 nm, less than or equal to about 196 nm, or less than or equal to about 195 nm. In some example embodiments, the thickness of the lower reflective layer 17c may be less than or equal to about 100 nm, less than or equal to about 99 nm, less than or equal to about 98 nm, less than or equal to about 97 nm, less than or equal to about 96 nm, or less than or equal to about 95 nm. Within the above ranges, heat or infrared light passing through the pixel structure 15 configured to sense heat or infrared light may be effectively reflected to be supplied to the pixel structure 15 configured to sense heat or infrared light.

The microbolometers 20 and 30 shown in FIGS. 4 and 5 may further include a side metal layer inside the cavity 13 in addition to the lower reflective layers 17a and 17b. These structures are shown in FIGS. 6 and 7, respectively.

Figure 6:
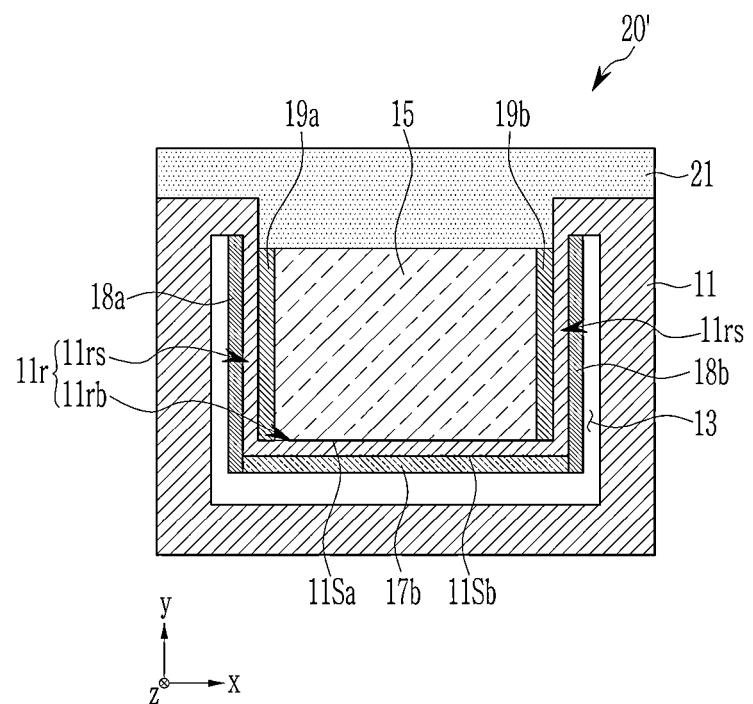
FIG. 6 is a schematic cross-sectional view of a microbolometer according to some example embodiments.
Figure 7:
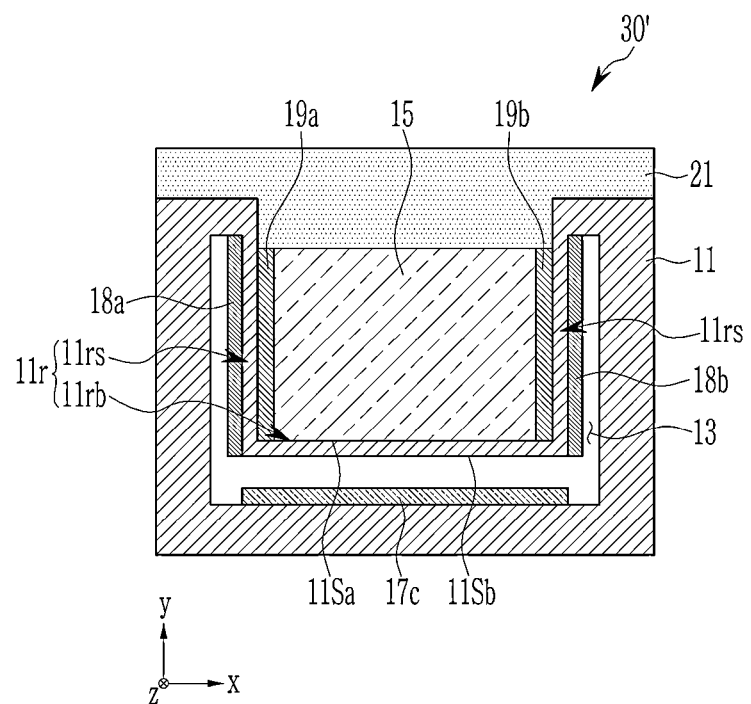
FIG. 7 is a schematic cross-sectional view of a microbolometer according to some example embodiments.

FIGS. 6 and 7 are schematic cross-sectional views of a microbolometer according to some example embodiments. Referring to FIG. 6, the microbolometer 20' according to some example embodiments has the same configuration as some example embodiments, including the example embodiments shown in FIG. 4 except that side metal layers 18a and 18b are further formed inside the cavity 13. Referring to FIG. 7, the microbolometer 30' according to some example embodiments has the same configuration as some example embodiments, including the example embodiments shown in FIG. 5 except that side metal layers 18a and 18b are further formed inside the cavity 13.

The microbolometers 10, 10', 20, 20', 30, and 30' illustrated in FIGS. 2 to 7 may further include a support inside the cavity disposed on the bottom surface of the substrate 11. The structure of the microbolometer in which microbolometer 10 shown in FIG. 2 further includes a support inside the cavity located on the bottom surface of the substrate 11 is illustrated in FIG. 8.

Figure 8:
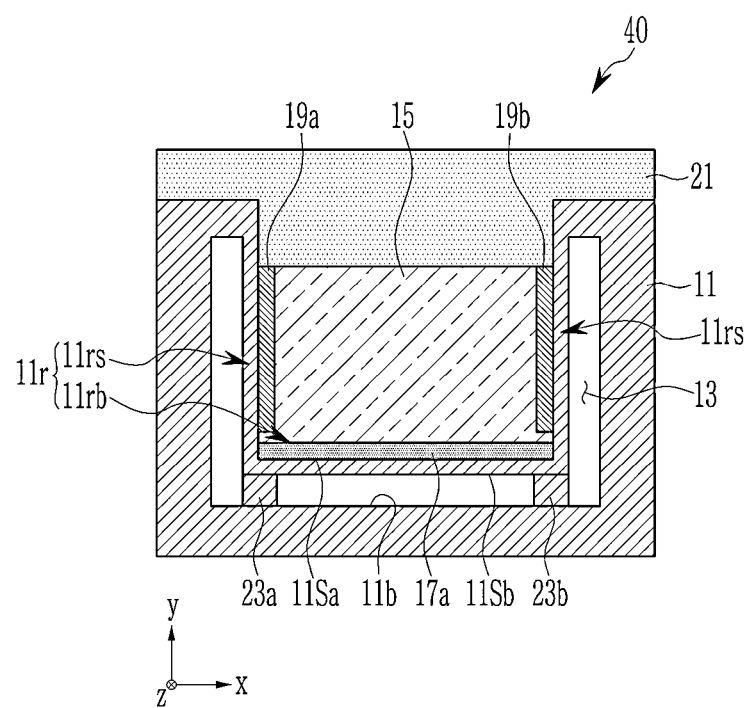
FIG. 8 is a schematic cross-sectional view of a microbolometer according to some example embodiments.

FIG. 8 is a schematic cross-sectional view of a microbolometer according to some example embodiments.

Referring to FIG. 8, a microbolometer 40 according to some example embodiments includes a substrate 11 including a recess portion; a cavity 13 disposed inside the substrate along a bottom portion 11rb and opposite side portions 11rs of the substrate 11; supports 23a and 23b (also referred to herein as support structures) disposed inside the cavity 13 on the bottom surface 11b of the substrate 11; a lower reflective layer 17a disposed on the upper surface 11Sa of the substrate 11 on the upper portion of the cavity 13; a first electrode 19a and a second electrode 19b inside both inner side surfaces 11rsi of the recess portion 11r and facing each other; a pixel structure 15 configured to sense heat or infrared light which are disposed inside the recess portion 11r and includes a heat or infrared absorption layer embedded in the substrate; and a planarization layer 21 covering the entire upper portion of the substrate 11.

The microbolometer 40 shown in FIG. 8 has the same configuration as the microbolometer 10 shown in FIG. 2 except that it further includes supports 23a and 23b inside the cavity on the bottom surface 11b of the substrate 11. As shown, the supports 23a and 23b may each extend from contacting the bottom surface 11b of the substrate, across the cavity 13, to contact an opposing lower surface 11Sb of the bottom portion 11rb of the recess portion 11r of the substrate 11.

The supports 23a and 23b may be porous supports. The porous support may be a porous silica support. The shape of the support may have any of a polyhedral shape, a spherical shape, and the like.

In some example embodiments, the pixel structure 15 may include a structure in which a resistive layer, an insulating layer, and an absorption layer are sequentially stacked. Such a structure is shown in FIG. 9.

Figure 9:
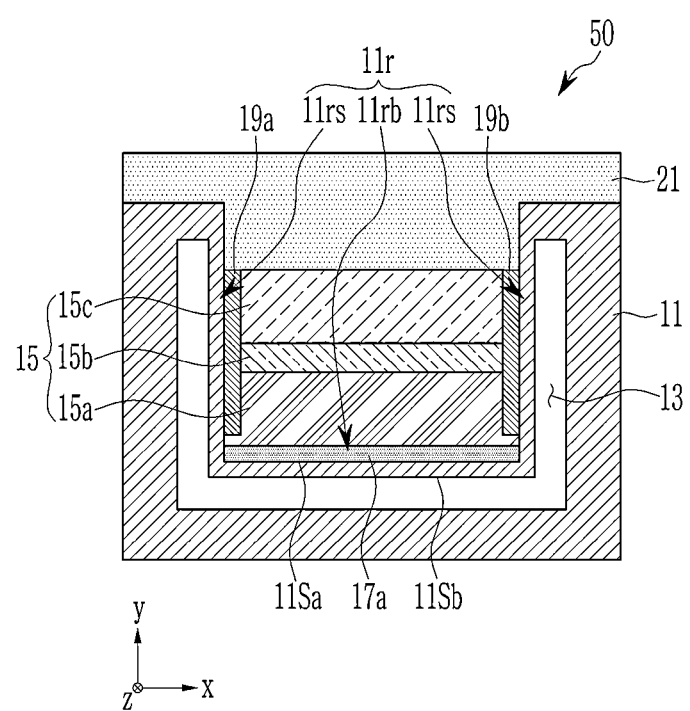
FIG. 9 is a schematic cross-sectional view of a microbolometer according to some example embodiments.

FIG. 9 is a schematic cross-sectional view of a microbolometer according to some example embodiments. Referring to FIG. 9, a microbolometer 50 according to some example embodiments includes a substrate 11 including a recess portion 11r; a cavity 13 disposed inside the substrate along a bottom portion 11rb and both side portions 11rs of the recess portion 11r of the substrate 11; a lower reflective layer 17a disposed on the upper surface 11Sa of the substrate 11 on the upper portion of the cavity 13; a first electrode 19a and a second electrode 19b inside opposing inner side surfaces 11rsi of the recess portion 11r and facing each other; a pixel structure 15 configured to sense heat or infrared light inside the recess portion 11r; and a planarization layer 21 covering the entire upper portion of the substrate 11, like some example embodiments, including the example embodiments shown in FIG. 2. The pixel structure 15 may include a resistive layer 15a, an insulating layer 15b, and a heat or infrared light absorption layer 15c.

The resistance layer 15a may include amorphous silicon doped with impurities, single crystal silicon (Si), or silicon germanium ($Si_{1-x}Ge_x$, x=0.2 to 0.5). The insulating layer 15b may include silicon oxide ($SiO_2$) or silicon nitride ($Si_3N_4$). The heat or infrared light absorption layer 15c may include a heat or infrared sensing polymer; $VO_x$ (x=1.5 to 2.0); TIN; a metal such as titanium (Ti) or nickel-chromium (Ni—Cr); or any combination thereof, as described above. A sum of the thicknesses of the resistive layer 15a, insulating layer 15b, and heat or infrared light absorption layer 15c may be $\lambda/4$ (wherein, $\lambda$ is the infrared wavelength to be detected and is generally about 1 μm to about 20 μm). A thickness of the resistive layer 15a may be in the range of about 50 nm to about 150 nm, a thickness of the insulating layer 15b may be in the range of about 100 nm to about 200 nm, and a thickness of the heat or infrared light absorption layer 15c may be in the range of about 100 nm to about 500 nm.

FIGS. 2 to 8 illustrate microbolometers having one recess portion, and a plurality of these microbolometers may be connected to each other to form a pixel array. The pixel array of the microbolometer 10 of FIG. 2 is shown in FIG. 10.

Figure 10:
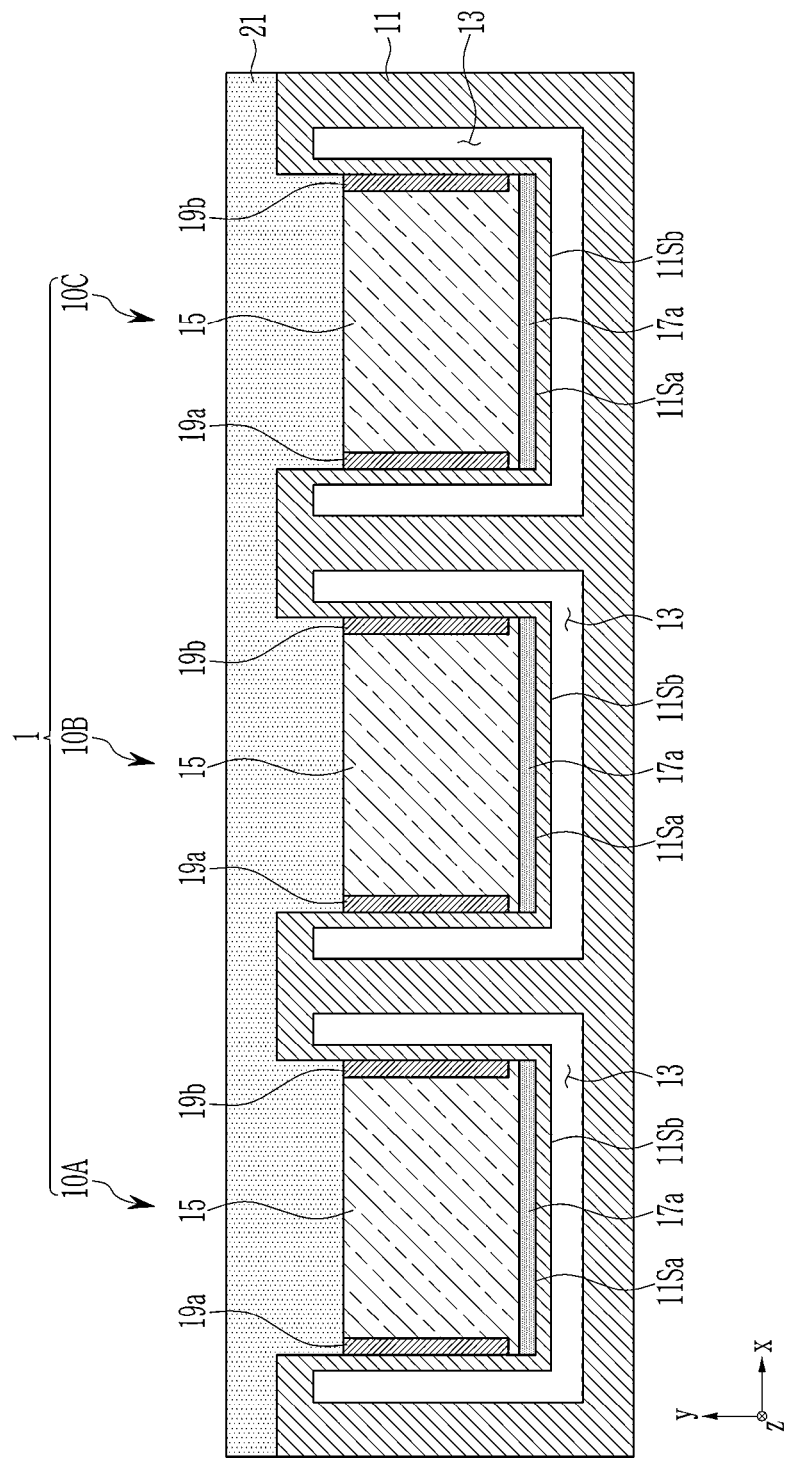
FIG. 10 is a view illustrating a pixel array according to some example embodiments.

FIG. 10 is a view illustrating a pixel array according to some example embodiments. Referring to FIG. 10, the pixel array 1 in which three microbolometers 10A, 10B, and 10C are connected is shown as an example, but a plurality of microbolometers may be connected to each other to form a pixel array.

The aforementioned sensor configured to sense heat or infrared light (e.g., microbolometers) may be applied to various electronic devices, for example, a camera, a camcorder, a mobile phone, a display device, a security device, or a medical device incorporating them, but is not limited thereto.

Hereinafter, some specific example embodiments of the inventive concepts are presented. However, the specific example embodiments described below are merely for illustrating or describing some example embodiments, and thus the scope of the inventive concepts are not limited thereto.

EXAMPLES

Synthesis Example 1: Preparation of Block Copolymer

Starting materials and regents are purchased from Sigma Aldrich Co., Ltd. and purged with nitrogen to remove oxygen before a reaction.

First, 2-hydroxyethyl acrylate (1.16 g, 10 mmoles) and t-butyl acrylate (1.28 g, 10 mmoles) are used in a mole ratio of 1:1 as in Reaction Scheme 1-1, and S,S-dibenzyl trithiocarbonate (29 mg, 0.1 mmole) is added thereto and then, purged with nitrogen for 5 minutes. Subsequently, azodiisobutyronitrile (AIBN) is added thereto and then, stirred at 75° C. under a nitrogen atmosphere. When the reaction has proceeded to 75%, after exhausting gas inside the reactor to block free radicals, the resultant is cooled to room temperature. The unreacted 2-hydroxyethyl acrylate and t-butyl acrylate are removed under vacuum, obtaining an intermediate (Mw: 162, Yield: 80%) as yellow oil.

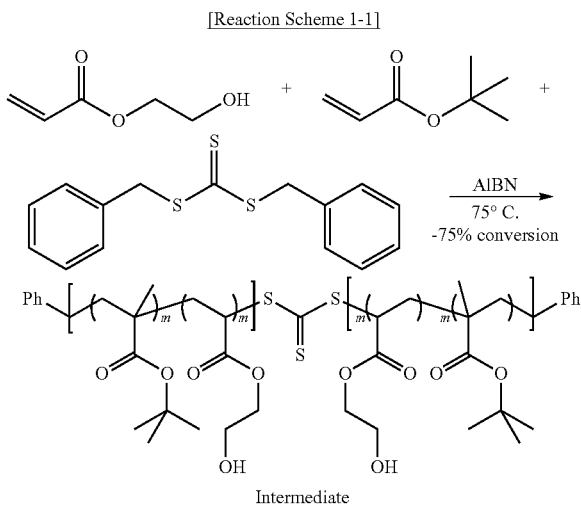

[Reaction Scheme 1-1]

Intermediate

As in Reaction Scheme 1-2 below, the intermediate obtained from Reaction Scheme 1-1, n-butyl acrylate (6.4 g, 50 mmoles), and AIBN are added thereto and then, polymerized under a nitrogen atmosphere at 75° C. for about 1 hour. When the polymerization reaction has proceeded to 75%, after exhausting gas in the reactor, the resultant is cooled to room temperature, obtaining Polymer A.

[Reaction Scheme 1-2]

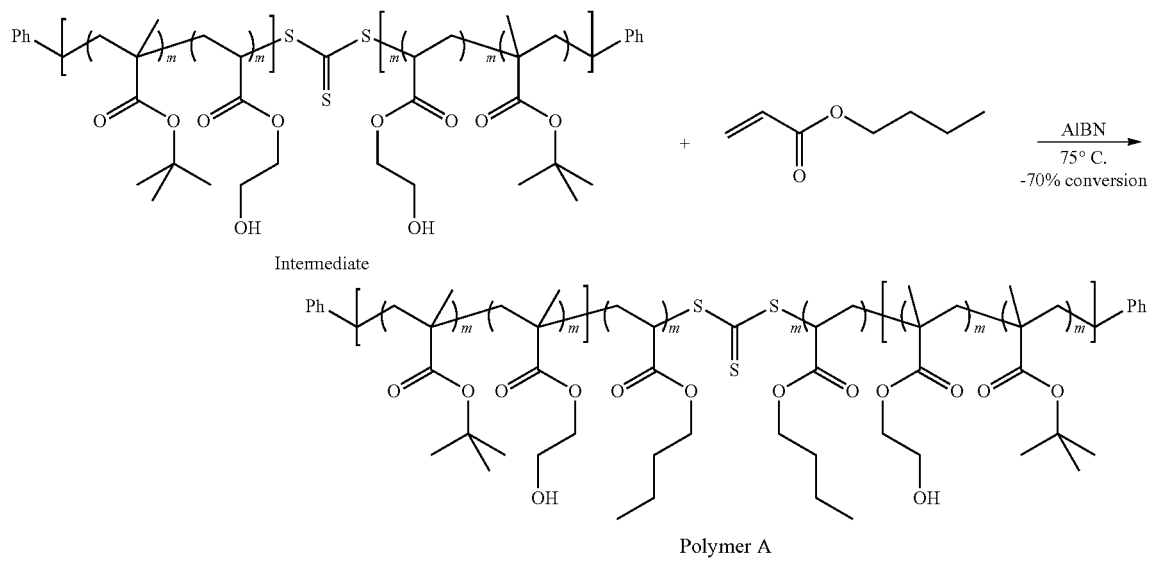

Polymer A

As in Reaction Scheme 1-3, Polymer A is maintained in a mixed solution of dichloromethane (DCM) and trifluoroacetic acid (TFA) (a volume ratio of 1:1, 100 ml) for 2 hours to remove a t-butyl group, preparing an ABA block copolymer (final polymer).

[Reaction Scheme 1-3]

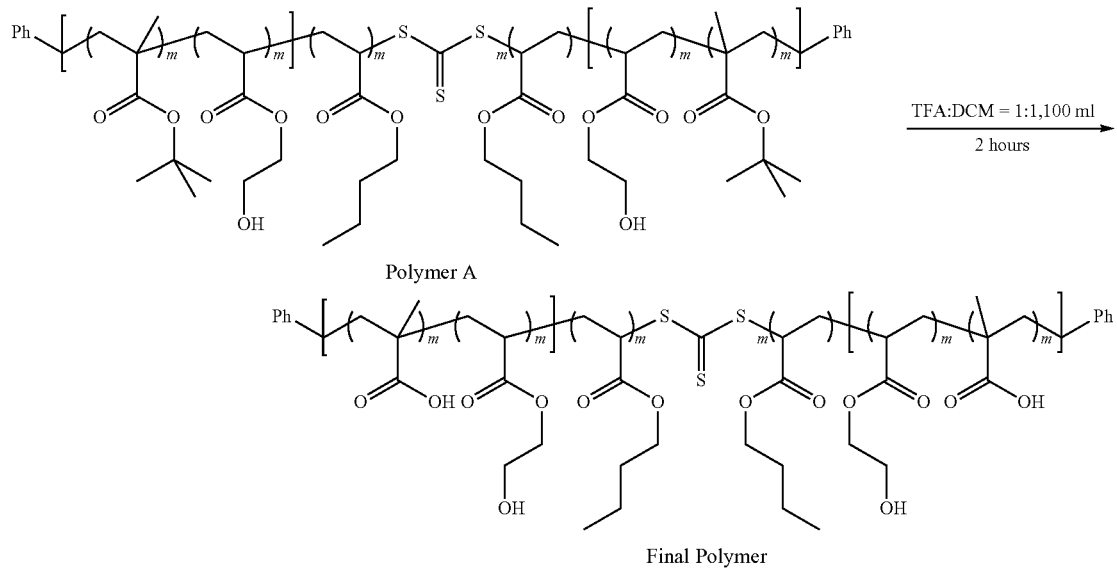

Final Polymer

Examples 1 to 12: Manufacture of Microbolometers

Cavities with a thickness as shown in Table 1 below (cavities on a lower surface (e.g., bottom portion) and cavities on both side surfaces (e.g., opposing side portions) are formed to have the same thickness) are formed inside a silicon substrate having a recess portion through an etching process using a photoresist. Herein, spacing among the cavities on both side surfaces (e.g., side portions) is adjusted to have a pixel size as shown in Table 1 below. Subsequently, aluminum is deposited inside the recess portion (top of the silicon substrate) to form a lower reflective layer with a thickness of about 10 nm, and gold is deposited respectively on both side surfaces to form first and second electrodes with each thickness of about 10 nm.

Separately, 99.9 ml of the block copolymer obtained from Synthesis Example 1 is dissolved at a concentration of 2 wt % in ethanol at 80° ° C. and then, stirred until the solution becomes uniform, preparing a block copolymer solution. An 0.3 M CaCl$_2$) ethanol solution is prepared. The block copolymer solution is injected onto the lower reflective layer of the recess portion and then, gelled by adding 172.8 ml of the CaCl$_2$) ethanol solution thereto. After the gelation reaction, a 2.1 µm-thick absorption layer is formed by drying the gelled block copolymer solution at room temperature, and a 400 nm-thick planarization layer is formed by using an acryl-based polymer (CAS No.: 25034-86-0), manufacturing each microbolometer with a structure shown in FIG. 2 according to Examples 1 to 12.

Examples 13 to 24: Manufacture of Microbolometers

Cavities with a thickness as shown in Table 1 below (cavities on a lower surface, e.g., bottom portion, and cavities on both side surfaces, e.g., side portions, are formed to have the same thickness) are formed inside a silicon substrate having a recess portion through an etching process using a photoresist. Herein, spacing among the cavities on both side surfaces is adjusted to have a pixel size as shown in Table 1 below. Subsequently, aluminum is deposited inside the recess portion (top of the silicon substrate) to form a lower reflective layer with a thickness of about 10 nm, and gold is deposited respectively on both side surfaces to form first and second electrodes with each thickness of about 10 nm.

On the lower reflective layer, VO$_x$ (x=1.5 to 2.0) is deposited to be 300 nm thick, forming a first absorption layer.

Separately, 99.9 ml of the block copolymer obtained from Synthesis Example 1 is dissolved at a concentration of 2 wt % in ethanol at 80° C. and then, stirred until the solution becomes uniform, preparing a block copolymer solution. A 0.3 M CaCl$_2$) ethanol solution is prepared. The block copolymer solution is injected onto the first absorption layer of the recess portion and then, gelled by adding 172.8 ml of the CaCl$_2$) ethanol solution thereto. After the gelation reaction, a 1.8 µm-thick second absorption layer is formed by drying the gelled block copolymer solution at room temperature, and a 400 nm-thick planarization layer is formed by using an acryl-based polymer (CAS No.: 25034-86-0), manufacturing each microbolometer with the structure shown in FIG. 2 but two absorption layers according to Example 13 to 24.

Evaluation

Evaluation 1: Insulation Evaluation According to Pixel Size

A laser 8 µm and a chopper and beam splitter installed to divide a beam path to two are used to irradiate light to the absorption layers of the microbolometers according to Examples 1 to 12, and a mercury cadmium telluride (MCT) detector is used to measure input power and heat generated therefrom, and the results are shown in Table 1.

TABLE 1

| Example | Pixel Size (µm) | Cavity (nm) | Thermal Insulation (mK/W) |
|---|---|---|---|
| 1 | 5 | 100 | 92 |
| 2 | 11 | 300 | 82 |
| 3 | 15 | 400 | 73 |
| 4 | 23 | 700 | 58 |
| 5 | 25 | 800 | 53 |
| 6 | 30 | 1000 | 45 |
| 7 | 32 | 1000 | 40 |
| 8 | 34 | 1100 | 38 |

TABLE 1-continued

| Example | Pixel Size (µm) | Cavity (nm) | Thermal Insulation (mK/W) |
|---|---|---|---|
| 9 | 36 | 1200 | 32 |
| 10 | 38 | 1300 | 27 |
| 11 | 40 | 1300 | 25 |
| 12 | 42 | 1400 | 19 |

Referring to Table 1, the microbolometers according to Examples 1 to 12 turn out to have various pixel sizes of 5 µm to 42 µm and in addition, exhibit excellent thermal insulation.

While the inventive concepts have been described in connection with what is presently considered to be practical example embodiments, it is to be understood that the inventive concepts are not limited to such example embodiments. On the contrary, the inventive concepts are intended to cover various modifications and equivalent arrangements included within the spirit and scope of the appended claims.

<Description of Symbols>

10, 10', 20, 20', 30, 30', 40, 50, 10A, 10B, 10C: microbolometer
11: substrate    13: cavity
17a, 17b, 17c: lower reflective layer
19a: first electrode    19b: second electrode
15: pixel structure configured to sense heat or infrared light
21: planarization layer
18a, 18b: side metal layer    23a, 23b: support

What is claimed is:

1. A sensor configured to sense heat or infrared light, the sensor comprising
   a substrate including a recess portion having a bottom portion and opposite side portions connected to opposite ends of the bottom portion, the recess portion having outer surfaces at least partially defining a recess into the substrate, the substrate including one or more inner surfaces at least partially defining a cavity inside the substrate along the bottom portion and the opposite side portions of the recess portion;
   a lower reflective layer on at least one of an upper surface of the bottom portion of the substrate, a lower surface of the bottom portion of the recess portion of the substrate, or a surface opposite to the lower surface of the bottom portion of the recess portion of the substrate;
   a first electrode and a second electrode inside opposing inner side surfaces of the recess portion and facing each other;
   a pixel structure configured to sense heat or infrared light inside the recess portion and embedded in the substrate; and
   a planarization layer covering an entire upper portion of the substrate.

2. The sensor of claim 1, wherein
   the cavity includes a plurality of cavities that are connected to each other or are isolated from each other.

3. The sensor of claim 1, wherein
   a thickness of the cavity along the opposite side portions of the recess portion of the substrate and a thickness of the cavity along the bottom portion of the substrate are a same thickness or are different from each other.

4. The sensor of claim 1, wherein
   a thickness of the cavity along the opposite side portions of the substrate and a thickness of the cavity along the bottom portion of the substrate are each about 50 nm to about 2000 nm, respectively.

5. The sensor of claim 1, wherein
a thickness of the lower reflective layer is about 2 nm to about 200 nm.

6. The sensor of claim 1, wherein
each of the first electrode and the second electrode have a thickness of about 3 nm to about 300 nm.

7. The sensor of claim 1, further comprising:
side metal layers on opposite side surfaces of the opposite side portions of the recess portion of the substrate.

8. The sensor of claim 7, wherein
each of the side metal layers has thickness of about 2 nm to about 200 nm.

9. The sensor of claim 1, wherein
the pixel structure configured to sense heat or infrared light includes an absorption layer including a heat or infrared sensing polymer; $VO_x$ (x=1.5 to 2.0); TiN; a metal such as titanium (Ti) or nickel-chromium (Ni—Cr); or any combination thereof.

10. The sensor of claim 1, wherein
the heat or infrared sensing polymer includes a block copolymer including a first structural unit represented by Chemical Formula 1, a second structural unit represented by Chemical Formula 2, and a third structural unit represented by Chemical Formula 3; and a polyvalent metal ion coordinating with a side chain group of the block copolymer:

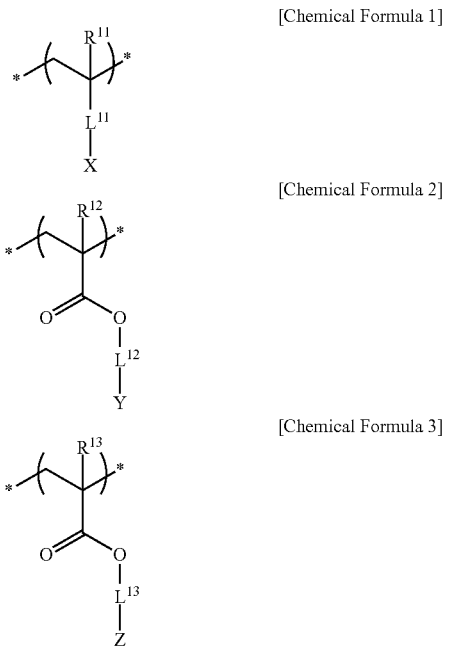

[Chemical Formula 1]

[Chemical Formula 2]

[Chemical Formula 3]

wherein, in Chemical Formulas 1 to 3,
$R^{11}$, $R^{12}$, and $R^{13}$ are each independently hydrogen or a C1 to C6 alkyl group,
$L^{11}$ and $L^{12}$ are each independently a single bond, a substituted or unsubstituted C1 to C10 alkylene group, a C2 to C20 alkylene group in which at least one methylene group is replaced by a linking group of —O—, —S—, —C(=O)—, —S(=O)—, —S(=O)$_2$—, —C(=O)—O—, —O—C(=O)—, —C(=O)NR—, or any combination thereof, wherein R is hydrogen or a C1 to C6 alkyl group, or a substituted or unsubstituted C6 to C10 arylene group, $L^{13}$ is a single bond, a substituted or unsubstituted C1 to C20 alkylene group, a substituted or unsubstituted C3 to C20 cycloalkylene group, or a substituted or unsubstituted C6 to C20 arylene group, X is a carboxyl group (—COOH), a sulfonic acid group (—S(=O)$_2$OH), or a phosphoric acid group (—O—P(=O)(OH)$_2$), Y is a hydroxy group (—OH), an alkoxy group (—OR, wherein R is a linear or branched C1 to C10 alkyl group), an ester group (C(=O)OR, wherein R is a linear or branched C1 to C10 alkyl group), a sulfonate ester group (—S(=O)$_2$OR, wherein R is a linear or branched C1 to C10 alkyl group), a phosphoric acid ester group (—O—P(=O)(OR)$_2$, wherein R is a linear or branched C1 to C10 alkyl group), an amine group, an isocyanate group (—N=C=O), or an urethane group (—NHC(=O)OR, wherein R is a linear or branched C1 to C10 alkyl group), and Z is a substituted or unsubstituted linear or branched C1 to C20 alkyl group, a substituted or unsubstituted C6 to C30 aryl group, a substituted or unsubstituted C3 to C30 heteroaryl group, a substituted or unsubstituted C3 to C30 cycloalkyl group, or a substituted or unsubstituted C3 to C30 heterocycloalkyl group.

11. The sensor of claim 10, wherein
in the block copolymer, a sum amount of the first structural unit and the second structural unit is about 2 moles to about 50 moles based on 100 moles of the third structural unit.

12. The sensor of claim 1, wherein
the pixel structure includes
a first absorption layer including $VO_x$ (x is 1.5 to 2.0); TiN; a metal such as titanium (Ti), or nickel-chromium (Ni—Cr); or any combination thereof, and
a second absorption layer including a heat or infrared sensing polymer.

13. The sensor of claim 1, wherein
the pixel structure is a multi-layered structure including a resistive layer, an insulating layer, and an absorption layer.

14. The sensor of claim 1, wherein
the sensor configured to sense heat or infrared light further includes a protective layer between the pixel structure and the planarization layer.

15. The sensor of claim 1, further comprising:
a microlens on the planarization layer.

16. The sensor of claim 1, further comprising
a support inside the cavity along the bottom portion of the substrate.

17. An electronic device comprising the sensor of claim 1.

* * * * *